(12) United States Patent
Hansen

(10) Patent No.: US 6,985,443 B2
(45) Date of Patent: Jan. 10, 2006

(54) METHOD AND APPARATUS FOR ALLEVIATING TRAFFIC CONGESTION IN A COMPUTER NETWORK

(75) Inventor: Per Bang Hansen, Rumson, NJ (US)

(73) Assignee: Photuris, Inc., Piscataway, NJ (US)

( * ) Notice: Subject to any disclaimer, the term of this patent is extended or adjusted under 35 U.S.C. 154(b) by 905 days.

(21) Appl. No.: 09/879,844

(22) Filed: Jun. 12, 2001

(65) Prior Publication Data

US 2002/0188751 A1 Dec. 12, 2002

(51) Int. Cl.
*H04L 12/26* (2006.01)

(52) U.S. Cl. .......................... 370/237; 398/49
(58) Field of Classification Search ................ 370/216, 370/217, 219, 220, 221, 225, 229, 230, 235, 370/237, 248, 252, 254, 256, 386, 389, 395.5; 398/5, 49, 50–51, 57–58
See application file for complete search history.

(56) References Cited

U.S. PATENT DOCUMENTS

| | | | | |
|---|---|---|---|---|
| 5,430,727 A | 7/1995 | Callon | ...................... | 370/85.13 |
| 5,712,932 A | 1/1998 | Alexander et al. | ............. | 385/24 |
| 5,878,177 A | 3/1999 | Karasan et al. | ................ | 385/17 |
| 6,069,719 A | 5/2000 | Mizrahi | ....................... | 359/124 |
| 6,084,892 A | 7/2000 | Benash et al. | ............... | 370/701 |
| 6,530,032 B1 * | 3/2003 | Shew et al. | ..................... | 714/4 |
| 6,708,000 B1 * | 3/2004 | Nishi et al. | ..................... | 398/1 |
| 6,856,620 B1 * | 2/2005 | Dunsmore et al. | .......... | 370/389 |

OTHER PUBLICATIONS

U.S. Appl. No. 09/571,833, filed May 16, 2000, Wagener et al.
U.S. Appl. No. 09/691,812, filed Oct. 19, 2000, Wagener et al.

* cited by examiner

*Primary Examiner*—Wellington Chin
*Assistant Examiner*—Brenda Pham
(74) *Attorney, Agent, or Firm*—Mayer Fortkort & Williams PC; Suart H. Mayer, Esq.

(57) ABSTRACT

A method is provided for alleviating congestion in a computer network. The network includes a plurality of nodes interconnected by communication links, which communicate in accordance with at least an optical layer protocol and a second protocol layer. The method begins by receiving a signal in accordance with the optical layer protocol and determining if local forwarding capacity is available to forward the signal in accordance with the second protocol layer. If the local forwarding capacity is unavailable, the method continues by forwarding the signal in accordance with the optical layer protocol to another node having excess capacity so that the other node can forward the signal in accordance with the second protocol layer.

31 Claims, 4 Drawing Sheets

METHOD AND APPARATUS FOR ALLEVIATING TRAFFIC CONGESTION IN A COMPUTER NETWORK

FIELD OF THE INVENTION

The present invention relates generally to a method and apparatus for alleviating congestion in a computer network and more generally to a method and apparatus for alleviating congestion in a computer network that employs multiple layers of protocols.

BACKGROUND OF THE INVENTION

To facilitate an understanding of the present invention, an overview of network protocols and devices will be presented below.

COMPUTER NETWORK PROTOCOLS

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to end reliable data delivery.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

The Internet is a protocol-specific collection of networks, including Arpanet, NSFnet, regional networks such as NYsernet, local networks at a number of university and research institutions, and a number of military networks. The ID protocols used by the Internet are generally referred to as the TCP/IP suite of protocols. TCP/IP deviates from the seven-layer OSI model in that it has five layers. These five layers are combinations and derivatives of the seven-layer OSI model. A rough correspondence between the seven layers of the OSI model and TCP/IP is shown in FIG. 1.

The protocols provide a set of services that permit users to communicate with each other across the entire Internet. The specific services that these protocols provide are not important to the present invention, but include file transfer, remote login, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

NETWORK LEVEL DEVICES

The end systems (e.g., computers or printers) which form a computer network are interconnected by devices known as routers. Each end system is attached to one of the network's routers and each router is responsible for forwarding communications to and from its attached end systems. A router operates at the network layer level and implements the IP protocol. When a router receives a data packet, it reads the data packet's destination address from the data packet header, and then transmits the data packet on the link leading most directly to the data packet's destination. Along the path from source to destination, a data packet may be transmitted along several links and pass through several routers, each router on the path reading the data packet header and forwarding the data packet accordingly.

To determine how user data packets should be forwarded, each router typically knows the locations of the network's end systems (i.e., which routers are responsible for which end systems), the nature of the connections between the routers, and the states (e.g., operative or inoperative) of the links forming those connections. Using this information, each router can compute effective routes through the network and avoid, for example, faulty links or routers. A procedure for performing these tasks is generally known as a "routing algorithm."

A router also performs protocol translation. One example is at layers 1 and 2 of the TCP/IP model. If the datagram arrives via an Ethernet interface and is destined to exit on a serial line, for example, the router will strip off the Ethernet header and trailer, and substitute the appropriate header and trailer for the specific network media, such as SMDS, by way of example.

PHYSICAL LAYER DEVICES

The TCP/IP protocol suite may operate over many different physical layer technologies. For example, rapidly growing use is being made of optical fiber as the physical transmission medium through which optical signals travel. Optical communication systems may be configured to carry an optical channel of a single wavelength over one or more optical waveguides. To convey information from plural sources time-division multiplexing (TDM) is sometimes employed. In time-division multiplexing, a particular time slot is assigned to each information source, the complete signal being constructed from the signal portion collected from each time slot. While this is a useful technique for carrying plural information sources on a single channel, its capacity is limited by fiber dispersion and the need to generate high peak power pulses.

An alternative multiplexing technique that may be employed to increase capacity is wavelength division multiplexing (WDM). A WDM system employs plural optical signal channels, each channel being assigned a particular channel wavelength. In a WDM system, optical signal channels are generated, multiplexed to form an optical signal comprised of the individual optical signal channels, transmitted over a single waveguide, and demultiplexed such that each channel wavelength is individually routed to a designated receiver.

The physical layer device corresponding to a router (which, as mentioned, is a network or IP level device) is an optical switch. In a WDM system, an optical switch allows different wavelength channels to be directed along different paths in the network. Optical switches may be fixed wavelength-dependent elements in which a given wavelength is always routed along a given path. More flexible optical switches are reconfigurable elements that can dynamically change the path along which a given wavelength is routed. Examples of a fixed optical switch include Add/Drop Multiplexers (OADM) and Optical Cross-Connects (OXC) such as disclosed in U.S. Pat. Nos. 5,504,827, 5,612,805, and 5,959,749, while general OXC switching architecture is reviewed by E. Murphy in chapter 10 of *Optical Fiber Telecommunications IIIB*, edited by T. Koch and I. Kaminow, for example. Examples of a more flexible reconfigurable optical switch are disclosed in U.S. application Ser. No. 09/571,833, filed May 16, 2000, and U.S. application Ser. No. 09/691,812, filed Oct. 19, 2000.

NETWORK CONGESTION

Data networks are typically designed and installed with a particular traffic pattern in mind. This traffic pattern dictates the size of routers, switches, repeaters, and other equipment, which are used to accommodate the maximum expected capacity at each node in the network. However, traffic flowing in a data network changes dramatically over time and, as a result, the physical location and size of routers and switching engines often do not match capacity requirements. Currently, networks and their management systems require that capacity upgrades be performed locally where a bottleneck occurs. This is typically done by physically adding switching capacity to the node in question, including the addition of repeaters and the like. In addition to being an expensive, time-consuming, and a slow-to-respond solution, such an approach fails to take advantage of other portions of the network, which at any given time may have excess capacity.

Accordingly, it would be desirable to alleviate network congestion that arises in one portion of a network by taking advantage of available resources in another portion of the network.

SUMMARY OF THE INVENTION

In accordance with the present invention, a method is provided for alleviating congestion in a computer network. The network includes a plurality of nodes interconnected by communication links, which communicate in accordance with at least an optical layer protocol and a second protocol layer. The method begins by receiving a signal in accordance with the optical layer protocol and determining if local forwarding capacity is available to forward the signal in accordance with the second protocol layer. If the local forwarding capacity is unavailable, the method continues by forwarding the signal in accordance with the optical layer protocol to another node having excess capacity so that the other node can forward the signal in accordance with the second protocol layer.

In accordance with one aspect of the invention, the second protocol layer includes a network layer protocol.

In accordance with another aspect of the invention, the optical layer protocol includes wavelength division multiplexing.

In accordance with yet another aspect of the invention, the network layer protocol is an Internet protocol.

In accordance with another aspect of the invention, the signal is received in accordance with the first protocol layer by an optical switch.

In accordance with another aspect of the invention, the optical switch includes an add/drop multiplexer or an optical cross-connect.

In accordance with another aspect of the invention, the optical switch is a reconfigurable optical element.

In accordance with yet another aspect of the invention, the local forwarding capacity is provided by a packet switching element such as an IP router.

In accordance with another aspect of the invention, a communication system is provided which includes a plurality of network nodes for receiving and forwarding data traffic. Each of said nodes has a prescribed optical switching capacity and a prescribed packet switching capacity that is less than the prescribed optical switching capacity. At least one communication link interconnects the network nodes. The system also includes a structure, embodied in hardware, software, or a combination of both, and which is associated with a given network node, for distributing traffic to be packet switched to another one of the network nodes if the prescribed packet switching capacity of the given network node is exceeded.

In accordance with another aspect of the invention, each of the plurality of network nodes includes traffic distributing structure.

In accordance with yet another aspect of the invention, the network nodes include an optical switch that provides the prescribed optical switching capacity.

In accordance with another aspect of the invention, the optical switch includes the traffic distributing structure.

DETAILED DESCRIPTION

The present invention addresses the problem that arises when there are local pockets of congestion in a network, which create bottlenecks of traffic that need to be routed, while at the same time other equipment is available to transfer the congested traffic to underutilized resources in the network that can more readily route the traffic. For example, the invention is applicable to optical data networks in which optical switches and high-capacity optical transmission lines allow large amounts of data to be forwarded to unused resources elsewhere in the network such as underutilized packet switching elements, e.g., IP routers.

Figure 1:
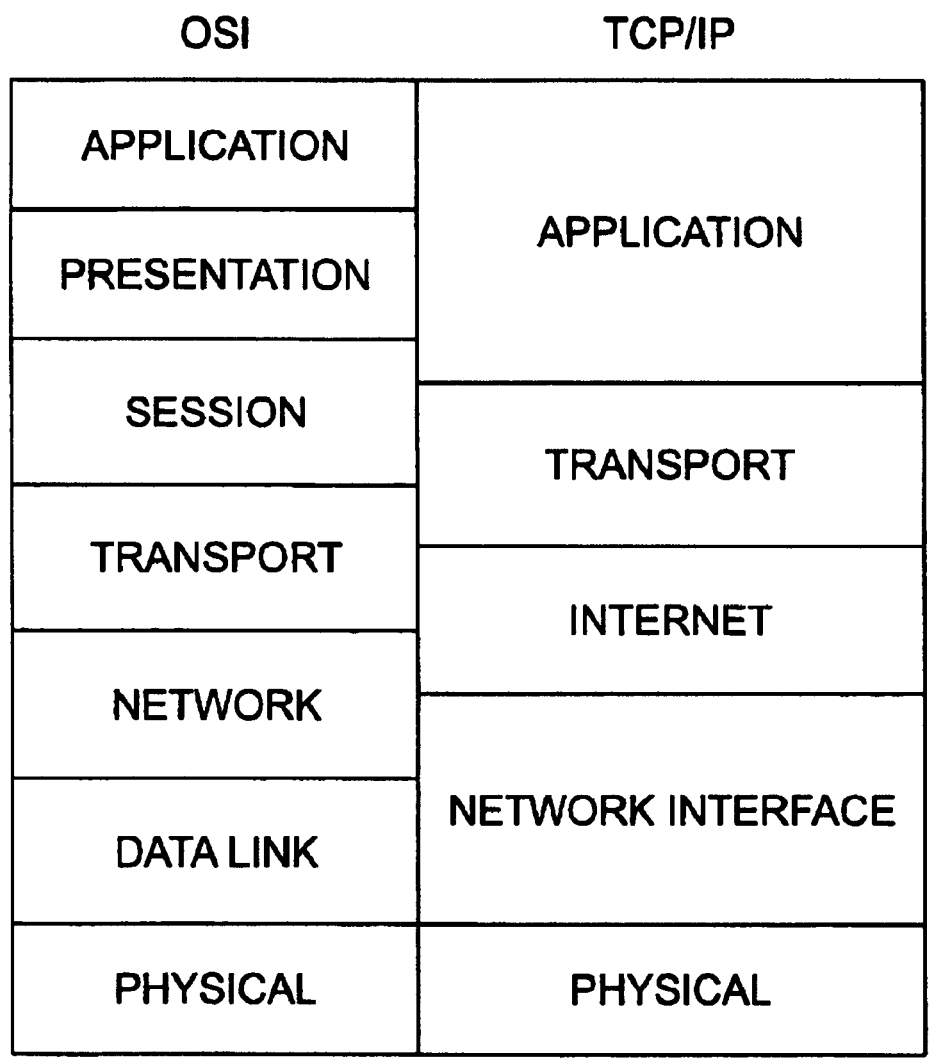
FIG. 1 is a comparative diagram of the International Standards Organization (ISO) Open System Interconnection (OSI) model for network architectures and a commonly used TCP/IP protocol.
Figure 2:
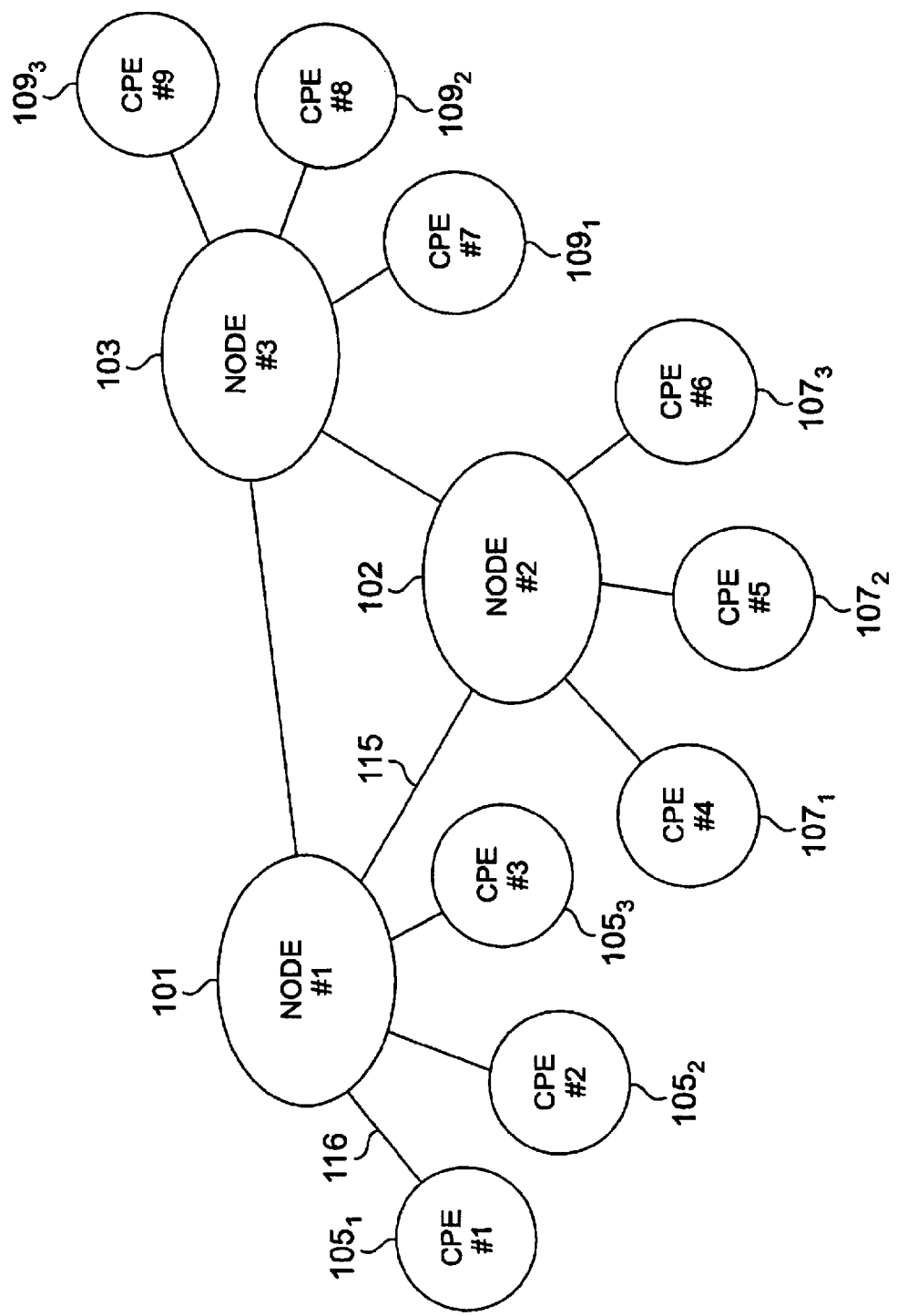
FIG. 2 shows a simplified block diagram of an exemplary computer network that includes multiple nodes and end systems interconnected by communication links.

FIG. 2 shows an exemplary computer network that includes end units interconnected by nodes. For purposes of illustration only the computer network will be depicted as a WDM optical communication system over which the TCP/IP suite of protocols is implemented. However, it should be noted that the present invention is equally applicable to other network protocols and technologies and is not limited to an all-optical transmission medium or IP packet switching.

As shown, the end units are the origination and destination points of traffic and will be referred to herein as customer premises equipment (CPE). Nodes 101, 102, and 103 are connected to nodes $105_1$–$105_3$, $107_1$–$107_3$, and $109_1$–$109_3$, respectively. The transmission paths connecting the nodes and CPEs are assumed to be all-optical paths in which WDM signals travel. Transmission paths connecting one node to another node will be referred to as transmission interfaces and transmission paths connecting one CPE to another CPE will be referred to as connection interfaces. For example, path 115 is a transmission interface and path 116 is a connection interface.

Figure 3:
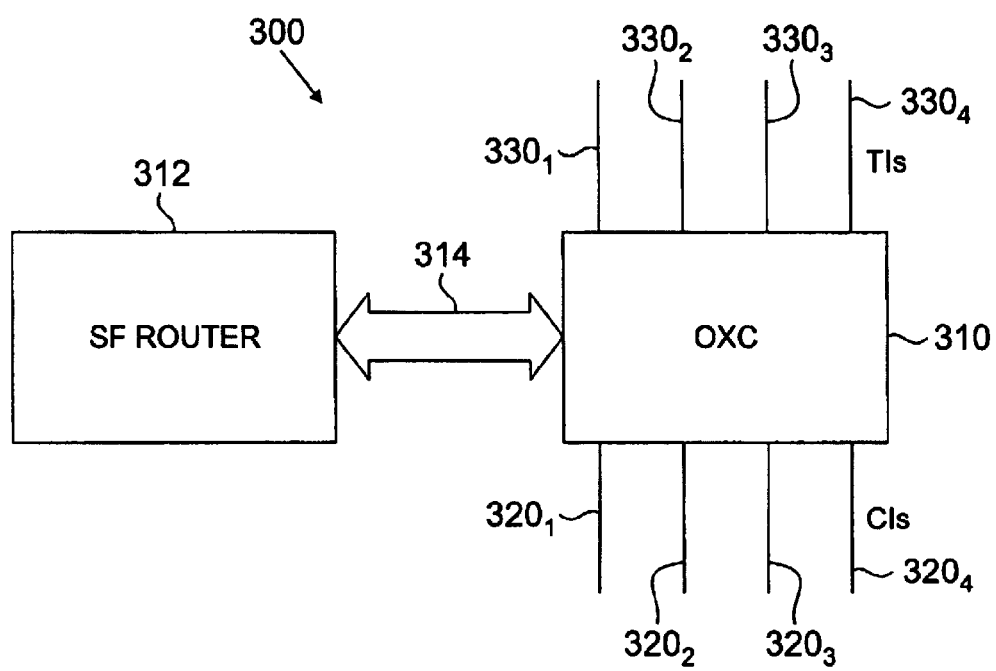
FIG. 3 shows a simplified schematic diagram of a network node constructed in accordance with the present invention.

Each node includes the equipment necessary to perform optical switching of the channels and packet switching of individual data packets. Accordingly, each node includes a router and an optical switch. A simplified schematic diagram of a node 300 is shown in FIG. 3. In this illustrative embodiment of the invention the optical switch 310 is depicted as an optical cross-connect and the router 312 is depicted as an IP router. As shown, the node 300 includes a plurality of input/output ports $320_1$–$320_4$ and $330_1$–$330_4$ for receiving the WDM optical signals from the optical transmission paths. Once optical cross-connect 310 receives a WDM optical signal, it may forward the signal to the router via interface 314, where it will undergo optical to electrical conversion. As previously described in more detail, the router 312 assembles the data packets and reads their destination address to determine the subsequent nodes to which the packets are to be forwarded. The data packets then undergo electrical to optical conversion in interface 314 and are directed onto the appropriate channel so that they can be forwarded to the appropriate nodes by the optical switch 310.

As previously mentioned, a situation may arise in which the amount of traffic received by a given node exceeds the throughput capacity of the router. Since the throughput capacity of the optical switch 310 is generally far greater than the throughput capacity of the router 312, the throughput capacity of the router 312 will generally be exceeded before that of the optical switch 310. That is, at any given time the optical switch 310 may retain the capacity to perform optical switching while its associated router 312 cannot perform any additional packet switching. In such a case, in accordance with the present invention, instead of forwarding the WDM optical signal to the router 312, the optical cross-connect 310 can forward the WDM signal directly to one of its output ports so that it is transmitted to another node. In a preferred embodiment of the invention, the optical cross-connect 310 forwards the WDM signal to another node having a router with excess throughput capacity.

Figure 4:
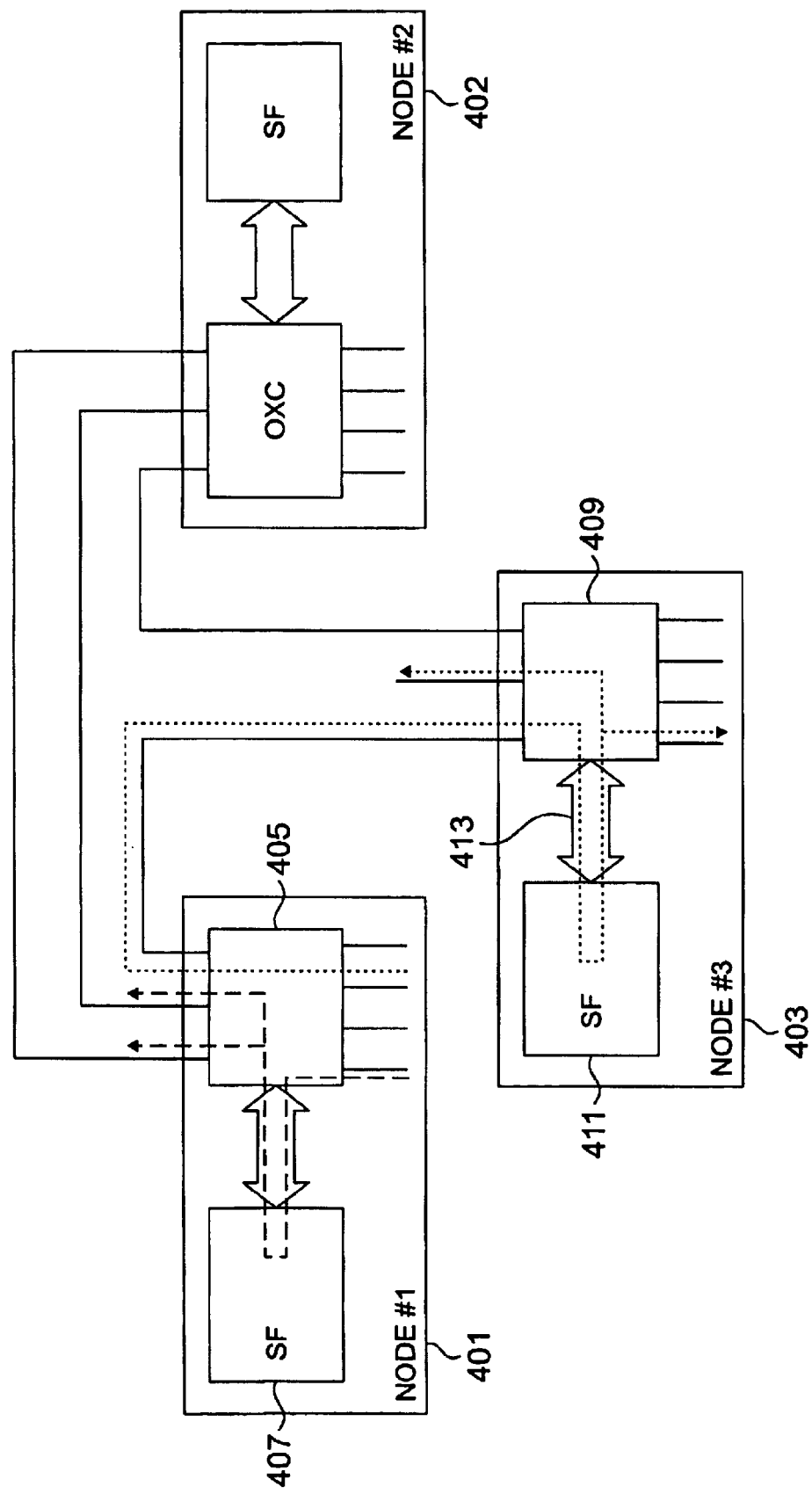
FIG. 4 shows a simplified block diagram of an exemplary computer network that includes multiple ones of the inventive nodes shown in FIG. 3.

FIG. 4 shows a network of three of the inventive nodes 401-403 of the type shown in FIG. 4. In this network two signals are assumed to originate from a CPE (not shown) that is in optical communication with node 401. If wavelength division multiplexing is employed, the two signals are located on different wavelength channels. One signal (shown by a dashed line in FIG. 4) is forwarded from the optical cross-connect 405 of node 401 to the router 407 of node 401. After receiving this signal the throughput capacity of the router 407 is assumed to be exceeded. In this case the second signal (shown by a dotted line) is forwarded by the optical cross-connect 405, via one of its output ports, to the optical cross-connect 409 of node 403, whose router 411 is currently underutilized. After converting the second signal to an electrical signal, the router 411 assembles the data packets and reads their destination address to determine the subsequent nodes to which the packets are to be forwarded. The data packets then undergo an electrical to optical conversion in interface 413 and are directed onto the appropriate channel so that they can be forwarded to the appropriate nodes by the optical switch 409. Accordingly, the otherwise unused capacity of node 403 is used when traffic that requires packet switching overburdens the router 411 of node 401. Consequently, with this method of distributing packet switching among different nodes, a given network is capable, on average, of handling a higher traffic load than it could in a conventional network in which the same node performs optical switching and routing of a given signal.

Of course, more generally, the present invention is applicable to any computer network having two or more protocol layers of switching in which one layer of switching can be distributed among different nodes.

What is claimed is:

1. A method for alleviating congestion in a computer network that includes a plurality of nodes interconnected by communication links which communicate in accordance with at least an optical layer protocol and a second protocol layer, said method comprising the steps of:
    (a) receiving a signal in accordance with the optical layer protocol;
    (b) determining if local forwarding capacity is available to forward the signal in accordance with the second protocol layer; and
    (c) if the local forwarding capacity in step (b) is unavailable, forwarding the signal in accordance with the optical layer protocol to another node having excess capacity so that said another node can forward the signal in accordance with the second protocol layer.

2. The method of claim 1 wherein said second protocol layer includes a network layer protocol.

3. The method of claim 1 wherein said optical layer protocol includes wavelength division multiplexing.

4. The method of claim 2 wherein said network layer protocol is an Internet protocol.

5. The method of claim 1 wherein the signal is received in accordance with the first protocol layer by an optical switch.

6. The method of claim 5 wherein said optical switch includes an add/drop multiplexer.

7. The method of claim 5 wherein said optical switch includes an optical cross-connect.

8. The method of claim 5 wherein said optical switch is a reconfigurable optical element.

9. The method of claim 1 wherein said local forwarding capacity is provided by a packet switching element.

10. The method of claim 9 wherein said packet switching element is an IP router.

11. The method of claim 1 wherein the step of forwarding the signal in accordance with the second protocol layer includes the step of converting the signal into an electrical signal.

12. In a communication network that includes a plurality of network nodes interconnected by communication links which communicate in accordance with at least an optical layer protocol and a second protocol layer, a network node, comprising:
    an optical switch receiving a signal in accordance with the optical layer protocol;
    a packet switching element having a prescribed routing capacity for forwarding the signal in accordance with a second protocol layer, said optical switch forwarding the signal in accordance with the optical layer protocol to another node having excess capacity so that said another node can forward the signal in accordance with the second protocol layer if the prescribed routing capacity of the packet switching element is exceeded; and
    an interface unit coupling the optical switch to the packet switching element.

13. The network node of claim 12 wherein said second protocol layer includes a network layer protocol.

14. The network node of claim 12 wherein said second protocol layer includes TCP/IP protocols.

15. The network node of claim 13 wherein said network layer protocol includes an IP protocol.

16. The network node of claim 12 wherein said optical layer protocol includes wavelength division multiplexing.

17. The network nod of claim 12 wherein said packet switching element is an IP router.

18. The network node of claim 12 wherein said optical switch includes an add/drop multiplexer.

19. The network node of claim 12 wherein said optical switch includes an optical cross-connect.

20. The network node of claim 12 wherein said optical switch is a reconfigurable optical element.

21. The network node of claim 12 wherein said interface includes an optical-to-electrical converter.

22. A communication system, comprising:
    a plurality of network nodes for receiving and forwarding data traffic;
    at least one communication link interconnecting the network nodes, each of said nodes having a prescribed optical switching capacity and a prescribed packet switching capacity that is less than said prescribed optical switching capacity;
    means, associated with a given network node, for distributing traffic to be packet switched to another one of said network nodes if said prescribed packet switching capacity of said given network node is exceeded.

23. The system of claim 22 wherein each of the plurality of network nodes includes traffic distributing means.

24. The system of claim 22 wherein said communication link is an optical communication link.

25. The system of claim 22 wherein said network nodes include an optical switch providing the prescribed optical switching capacity.

26. The system of claim 25 wherein said optical switch includes said traffic distributing means.

27. The system of claim 22 wherein said network nodes include an IP router providing the prescribed switching capacity.

28. The system of claim 24 wherein said communication link is a WDM link.

29. The system of claim 25 wherein said optical switch includes an add/drop multiplexer.

30. The system of claim 25 wherein said optical switch includes an optical cross-connect.

31. The system of claim 25 wherein said optical switch is a reconfigurable optical element.

* * * * *

UNITED STATES PATENT AND TRADEMARK OFFICE
CERTIFICATE OF CORRECTION

PATENT NO. : 6,985,443 B2
APPLICATION NO. : 09/879844
DATED : January 10, 2006
INVENTOR(S) : Per Bang Hansen Page 1 of 1

It is certified that error appears in the above-identified patent and that said Letters Patent is hereby corrected as shown below:

Col. 3, line 48, after first word "sources", insert - -, - -.

Col. 5, line 24, after "includes", insert - - the - -.

Col. 6, line 53, after "network", insert - -, - -.

Col. 6, line 60, after "signal", insert - -, - -.

Col. 6, line 61, after "case", insert - -, - -.

Col. 6, line 63, after "405", delete - -. - -.

Claim 17, Col. 8, line 20, after "network", change "nod" to - - node - -.

Signed and Sealed this

Twenty-second Day of August, 2006

JON W. DUDAS
*Director of the United States Patent and Trademark Office*